US011269323B2

(12) United States Patent
Golsch

(10) Patent No.: US 11,269,323 B2
(45) Date of Patent: Mar. 8, 2022

(54) REMOTE PARK ASSIST MESSAGE FLOW SYSTEMS AND METHODS

(71) Applicants: DENSO International America, Inc., Southfield, MI (US); DENSO CORPORATION, Kariya (JP)

(72) Inventor: Kyle Golsch, Pontiac, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 246 days.

(21) Appl. No.: 16/359,087

(22) Filed: Mar. 20, 2019

(65) Prior Publication Data
US 2019/0302759 A1     Oct. 3, 2019

Related U.S. Application Data

(60) Provisional application No. 62/648,820, filed on Mar. 27, 2018.

(51) Int. Cl.
*G05D 1/00*     (2006.01)
*G08G 1/14*     (2006.01)
(Continued)

(52) U.S. Cl.
CPC ............ *G05D 1/0022* (2013.01); *B62D 1/00* (2013.01); *B62D 15/0285* (2013.01);
(Continued)

(58) Field of Classification Search
CPC .. B60W 30/06; B60W 2556/45; B60W 50/14; B62D 15/0285; B62D 15/027; B62D 15/025; B62D 15/028; B62D 15/029
See application file for complete search history.

(56) References Cited

U.S. PATENT DOCUMENTS 8,930,045 B2   1/2015 Oman et al.
9,123,244 B2   9/2015 Daman et al.
(Continued)

FOREIGN PATENT DOCUMENTS

BR   102014017465 A2   2/2016
CN       104574593 A   4/2015
(Continued)

OTHER PUBLICATIONS

Techtarget, Asymmetric Communications, Aug. 2006 (Year: 2006).*

*Primary Examiner* — Kelly D Williams
(74) *Attorney, Agent, or Firm* — Harness, Dickey & Pierce, P.L.C.

(57) ABSTRACT

A system and method for a vehicle including a communication gateway in a vehicle configured to establish a wireless communication connection with a portable device; a plurality of object sensors that detects objects surrounding the vehicle; a remote park assist system configured to (i) identify at least one parking space based on data received from the plurality of object sensors; (iv) determine a movement trajectory for the vehicle; (v) transmit a vehicle maneuver request to the portable device; (vi) receive a plurality of responses from the portable device in response to transmitting the vehicle maneuver request; and (vii) maneuver the vehicle based on the plurality of object sensors, the plurality of responses, and the movement trajectory; and the portable device, in response to receiving a request from the remote park assist system, is configured to transmit the plurality of responses.

14 Claims, 10 Drawing Sheets

(51) Int. Cl.
  *G06F 3/0488* (2013.01)
  *H04W 4/80* (2018.01)
  *B62D 1/00* (2006.01)
  *B62D 15/02* (2006.01)

(52) U.S. Cl.
  CPC ......... *G05D 1/0016* (2013.01); *G06F 3/0488* (2013.01); *G08G 1/143* (2013.01); *H04W 4/80* (2018.02)

(56) References Cited

U.S. PATENT DOCUMENTS

| | | |
|---|---|---|
| 9,688,247 B1 | 6/2017 | Jayaraman et al. |
| 9,794,753 B1 | 10/2017 | Stitt et al. |
| 9,894,492 B1 | 2/2018 | Elangovan et al. |
| 10,002,479 B2 | 6/2018 | Oz et al. |
| 2011/0215921 A1 | 9/2011 | Ben Ayed et al. |
| 2012/0045058 A1 | 2/2012 | Weghaus |
| 2013/0214732 A1 | 8/2013 | Nowottnick |
| 2014/0152091 A1 | 6/2014 | Muller et al. |
| 2014/0188348 A1 | 7/2014 | Gautama et al. |
| 2014/0240091 A1 | 8/2014 | Talty et al. |
| 2014/0274013 A1 | 9/2014 | Santavicca |
| 2014/0330449 A1 | 11/2014 | Oman et al. |
| 2015/0127208 A1 | 5/2015 | Jecker et al. |
| 2015/0148989 A1 | 5/2015 | Cooper et al. |
| 2015/0161832 A1 | 6/2015 | Esselink et al. |
| 2015/0161834 A1 | 6/2015 | Spahl et al. |
| 2015/0310681 A1 | 10/2015 | Avery et al. |
| 2015/0356797 A1 | 12/2015 | McBride et al. |
| 2016/0050563 A1 | 2/2016 | Bronk |
| 2016/0063786 A1 | 3/2016 | Lewis et al. |
| 2016/0087485 A1 | 3/2016 | Maeda et al. |
| 2016/0150407 A1 | 5/2016 | Michaud et al. |
| 2017/0018128 A1 | 1/2017 | Berezin et al. |
| 2017/0062938 A1 | 3/2017 | Cheng et al. |
| 2017/0104589 A1 | 4/2017 | Lambert et al. |
| 2017/0132533 A1 | 5/2017 | Darnell et al. |
| 2017/0236351 A1 | 8/2017 | Menard et al. |
| 2017/0285629 A1* | 10/2017 | Christen ............... G05D 1/0016 |
| 2017/0303080 A1 | 10/2017 | Stitt et al. |
| 2017/0303090 A1 | 10/2017 | Stitt et al. |
| 2017/0309098 A1 | 10/2017 | Watters et al. |
| 2017/0330402 A1 | 11/2017 | Menard et al. |
| 2018/0029560 A1 | 2/2018 | Mohaupt et al. |
| 2018/0099643 A1 | 4/2018 | Golsch et al. |
| 2018/0103414 A1 | 4/2018 | Golsch |
| 2018/0126952 A1 | 5/2018 | Niemiec |
| 2018/0154865 A1 | 6/2018 | Bianchi, III et al. |
| 2018/0269565 A1 | 9/2018 | Guthrie et al. |
| 2019/0152472 A1* | 5/2019 | Aksyutina ................ B62D 1/00 |
| 2019/0220001 A1* | 7/2019 | Lavoie ............... B62D 15/0285 |
| 2019/0243380 A1* | 8/2019 | Lavoie ................ G05D 1/0016 |
| 2019/0279509 A1* | 9/2019 | Kamini ................... H04W 4/44 |

FOREIGN PATENT DOCUMENTS

| | | |
|---|---|---|
| DE | 102009041587 A1 | 3/2011 |
| DE | 102012007984 A1 | 3/2013 |
| EP | 1249379 A2 | 10/2002 |
| EP | 2800068 A2 | 11/2014 |
| FR | 3026212 A1 | 3/2016 |
| JP | 2015089733 A | 5/2015 |
| JP | 2015516772 A | 6/2015 |
| WO | WO-2015068032 A1 | 5/2015 |
| WO | WO-2015177298 A1 | 11/2015 |
| WO | WO-16156682 A1 | 10/2016 |
| WO | WO-2017/181035 A1 | 10/2017 |
| WO | WO-2017/181050 A1 | 10/2017 |
| WO | WO-18040641 A1 | 3/2018 |

\* cited by examiner

REMOTE PARK ASSIST MESSAGE FLOW SYSTEMS AND METHODS

CROSS-REFERENCE TO RELATED APPLICATION

This application claims the benefit of U.S. Provisional Application No. 62/648,820, filed on Mar. 27, 2018. The entire disclosure of the above application is incorporated herein by reference.

FIELD

The present disclosure relates to remote park assist (REPA) systems and methods for vehicles and more particularly to REPA systems and methods using wireless communication devices.

BACKGROUND

This section provides background information related to the present disclosure which is not necessarily prior art.

Remote park assist (REPA) systems identify a parking space based on a plurality of object sensors located on the exterior of the vehicle. The REPA system determines a movement trajectory for the vehicle to maneuver the vehicle into or out of the parking space. The REPA system may determine various vehicle parameters related to one or more brakes, a transmission, an engine, or a steering system for the movement trajectory. A driver of the vehicle may remain in the vehicle or may get out of the vehicle while the REPA system is maneuvering the vehicle into or out of the parking space. The REPA system maneuvers the vehicle as long as a continuous movement gesture is performed on a portable device by the driver of the vehicle. This helps to ensure the driver is held responsible for the vehicle even under automated control of the REPA system.

BRIEF DESCRIPTION OF THE DRAWINGS

The present disclosure will become more fully understood from the detailed description and the accompanying drawings.

Figure 1:
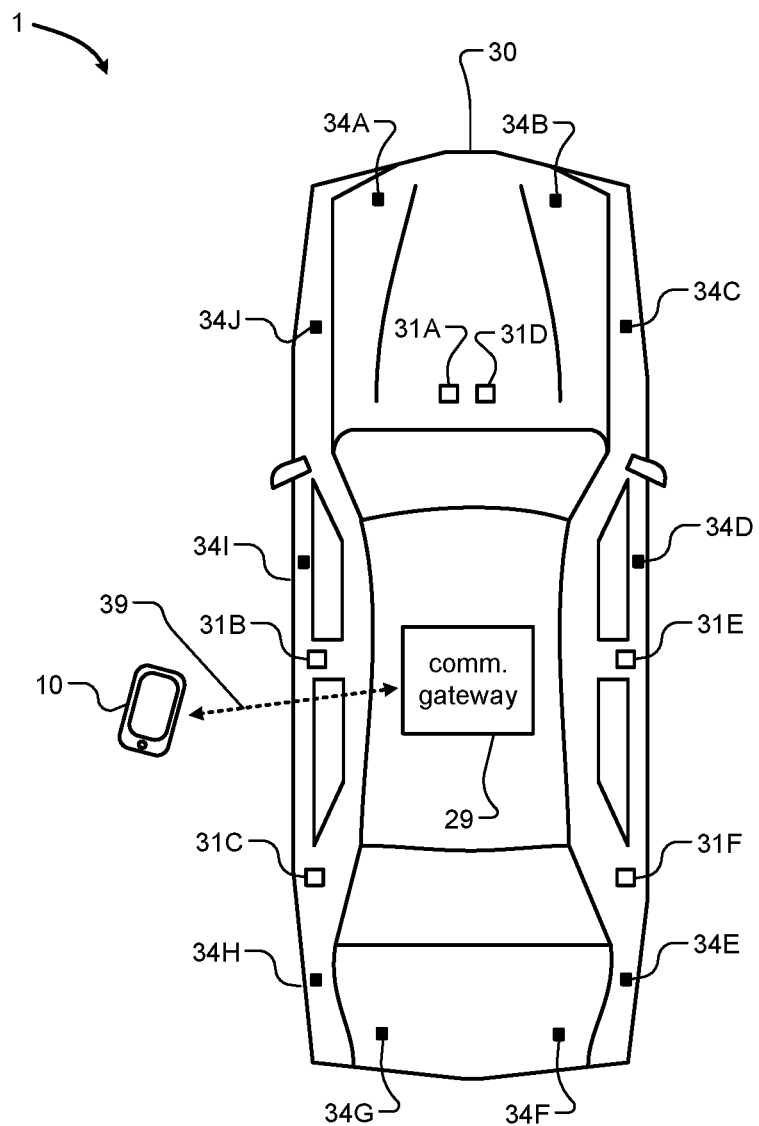
FIG. 1 illustrates a subject vehicle with a REPA system according to the present disclosure.

The drawings described herein are for illustrative purposes only of selected embodiments and not all possible implementations, and are not intended to limit the scope of the present disclosure.

In the drawings, reference numbers may be reused to identify similar and/or identical elements.

SUMMARY

This section provides a general summary of the disclosure, and is not a comprehensive disclosure of its full scope or all its features.

A system is provided that includes: a communication gateway in a vehicle configured to establish a wireless communication connection with a portable device. The system also includes a plurality of object sensors that detects objects surrounding the vehicle. The system also includes a remote park assist system configured to (i) identify at least one parking space based on data received from the plurality of object sensors; (ii) display the at least one parking space on a display of the vehicle; (iii) receive approval of the parking space; (iv) determine a movement trajectory for the vehicle based on a location of the parking space; (v) transmit a vehicle maneuver request to the portable device; (vi) receive a plurality of responses from the portable device in response to transmitting the vehicle maneuver request and prior to transmitting a next vehicle maneuver request; and (vii) maneuver the vehicle based on the plurality of object sensors, the plurality of responses, and the movement trajectory. The system also includes the portable device, in response to receiving a request from the remote park assist system, is configured to transmit the plurality of responses, where each response of the plurality of responses indicates whether user input has been received at the portable device.

A method is also provided and includes: (i) establishing, with a communication gateway in a vehicle, a wireless communication connection with a portable device; (ii) detecting objects surrounding the vehicle with a plurality of object sensors; (iii) identifying at least one parking space based on data received from the plurality of object sensors; (iv) displaying the at least one parking space on a display of the vehicle; (v) receiving approval of the parking space; (vi) determining a movement trajectory for the vehicle based on a location of the parking space; (vii) transmitting a vehicle maneuver request to the portable device; (viii) receiving a plurality of responses from the portable device in response to transmitting the vehicle maneuver request and prior to transmitting a next vehicle maneuver request; (ix) maneuvering the vehicle based on the plurality of object sensors, the plurality of responses and the movement trajectory; and (x) transmitting using the portable device, in response to receiving the vehicle maneuver request, the plurality of responses, where each response of the plurality of responses indicates whether user input has been received at the portable device.

Further areas of applicability of the present disclosure will become apparent from the detailed description, the claims, and the drawings. The detailed description and specific examples are intended for purposes of illustration only and are not intended to limit the scope of the disclosure.

DETAILED DESCRIPTION

Example embodiments will now be described more fully with reference to the accompanying drawings.

The present disclosure relates to systems, methods, and architecture to implement a remote park assist system (REPA) system using a consumer grade wireless protocol, such as, for example, a consumer grade wireless protocol based on the standardized specification of the Bluetooth Consortium, such as the Bluetooth Low Energy (BLE) communication protocol. Specifically, the present disclosure relates to a REPA system using a wireless connection for communication between the vehicle and a wireless communication enabled user device, such as a smartphone or another portable device. Alternatively, while the present disclosure describes establishing a wireless communication connection using Bluetooth or BLE, the systems and methods described herein could be used with other wireless communication protocols, such as Wi-Fi, Wi-Fi direct, ultra-wide band (UWB) communication, and/or impulse-radio (IR) UWB communication. The present disclosure is directed to systems, method, and architecture that optimize communication between the vehicle and the portable device in the REPA system. The teachings of the present disclosure are enhanced by a sensor network configured to find existing connections between the portable device and the vehicle, and measuring the timing and signal characteristics of the communication as discussed in pending application U.S. patent application Ser. No. 15/730,265, filed on Oct. 11, 2017, and published as U.S. Publication No. 2018/0099643 on Apr. 12, 2018, which is incorporated herein by reference.

Figure 2:
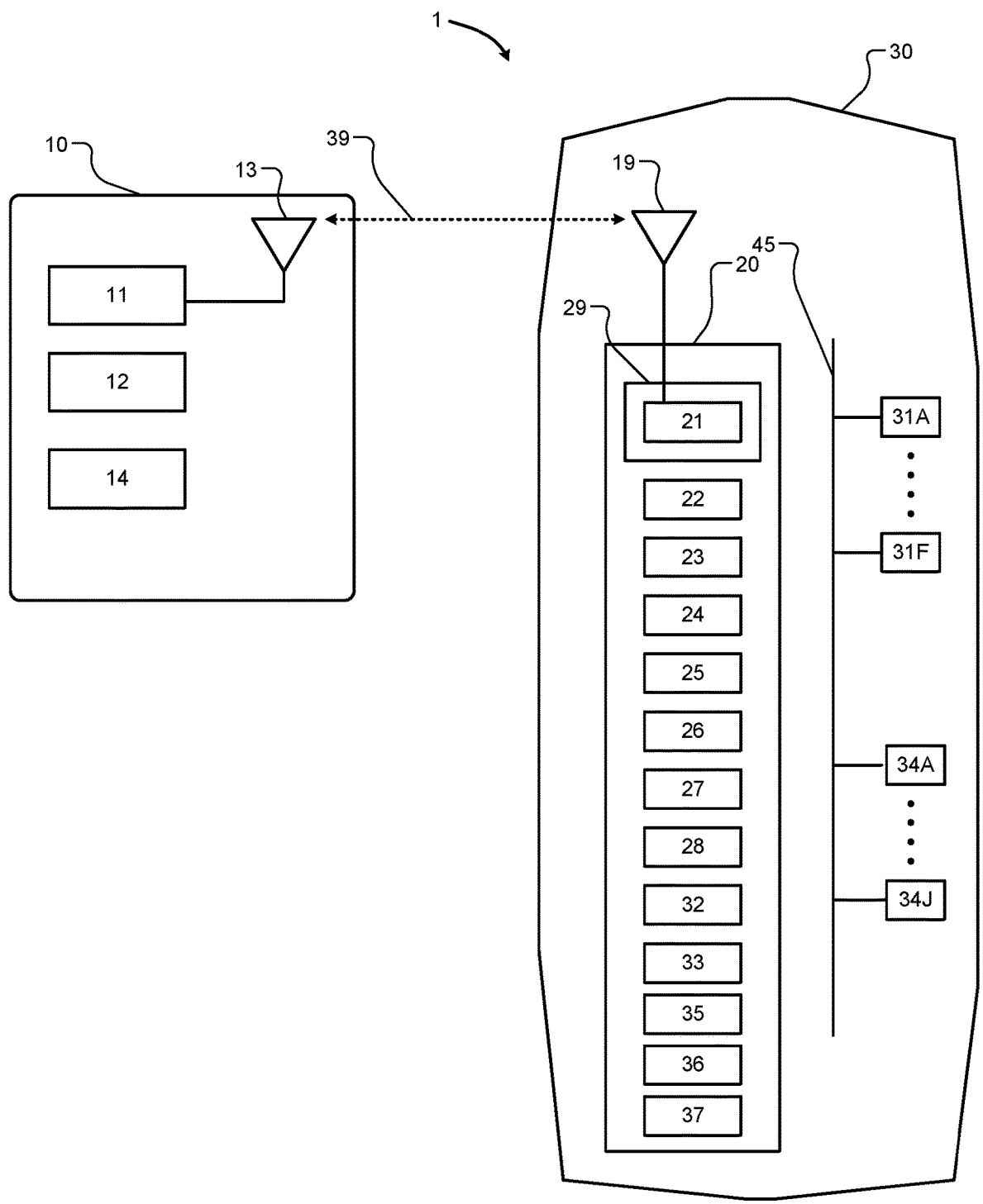
FIG. 2 illustrates a block diagram for a REPA system according to the present disclosure.

With reference to FIGS. 1 and 2, an example vehicle with a REPA system 1 is provided within a vehicle 30 and includes a communication gateway 29, at least a plurality of BLE sensors 31A-31F, referred to collectively as 31, and at least a plurality of object sensors 34A-34J, referred to collectively as 34. The REPA system 1 includes one or more vehicle modules 20 that are distributed throughout the vehicle 30 and are able to communicate with each other through, for example, a vehicle interface 45. In addition, some of the modules may be integrated into a single ECU or are able to communicate with each other using the vehicle interface 45. The vehicle interface 45, for example, may include a controller area network (CAN) bus for communication between main modules and/or lower data rate communication such as local interconnect network (LIN) for communication between the plurality of BLE sensors 31. The vehicle interface 45 can also include a clock extension peripheral interface (CXPI) bus. Additionally or alternatively, the vehicle interface 45 can include a combination of CAN bus, LIN, and CXPI bus communication interfaces. The structure of the BLE sensors 31 are discussed in further detail below with reference to FIG. 3.

The vehicle modules 20 can include, for example, the communication gateway 29 that includes a BLE chipset 21 connected to an antenna 19. As shown in FIG. 2, the antenna 19 may be located in the vehicle 30. Alternatively, the antenna 19 may be located included within the vehicle modules 20. Alternatively, the antenna 19 may be located outside of the vehicle 30. The vehicle modules 20 can also include a link authentication module 22 that authenticates a portable device 10 for communication via a secure communication link 39. The vehicle modules 20 can also include a data management layer 23 for push data. The vehicle modules 20 can also include a connection information distribution module 24. The vehicle modules 20 can also include a timing control module 25. The vehicle modules 20 can also include a telematics module 26, such as a global positioning system (GPS) module and/or other navigation or location modules. The vehicle modules 20 can also include a body control module. The vehicle modules 20 can also include a sensor processing and a localization module 32. The vehicle modules 20 can also include a security filtering module 33.

The vehicle module 20 can also include a transmission module 35 that controls operation of a transmission of the vehicle 30. For example, the transmission module 35 may transition the car from drive to park. The vehicle module 20 can also include a steering module 36. The steering module 36 controls a steering wheel of the vehicle which controls the wheels of the vehicle 30. The vehicle modules 20 can also include a brake module 37. The brake module 37 controls the brakes of the vehicle 30.

The vehicle modules 20 can also include a REPA module 27. The REPA module 27 is configured to receive information from the plurality of object sensors 34 in order to define a potential parking space. The REPA module 27 determines a movement trajectory for the vehicle based on the location of the parking space including determining various vehicle parameters related to one or more brakes, the transmission, the engine, or the steering system in order to maneuver the vehicle 30 into the parking space or out of the parking space. The REPA module 27 communicates with the portable device 10 through the communication gateway 29. As described in more detail in FIGS. 6-10, automated control of the vehicle 30 is conditioned on receiving continuous user input to the portable device 10. The REPA module 27 is also configured to gather location information from the plurality of BLE sensors and/or the localization module in order to determine if the portable device 10 is within a predetermined distance from the vehicle 30.

As shown in FIGS. 1 and 2, the portable device 10 can communicate with the communication gateway 29 of the vehicle 30 via the secure communication link 39. Without limitation, the portable device 10 may be any Bluetooth enabled communication device such as a smart phone, smart watch, wearable electronic device, key fob, tablet device, or other device associated with a user of the vehicle 30, such as an owner, driver, passenger of the vehicle 30, and/or a technician for the vehicle 30. As noted above, other wireless communication protocols could be used in place of Bluetooth or BLE, such as Wi-Fi, Wi-Fi direct, UWB, and/or IR USB. The portable device 10 can include a BLE chipset 11 connected to an antenna 13. The portable device 10 can also include application software 12 stored in a computer-readable storage module or device. The portable device 10 can also optionally include a GPS module 14 or other device location service.

The portable device 10 and the communication gateway 29 can establish the secure communication link 39, as a Bluetooth communication link, as provided for and defined by the Bluetooth specification. For example, the secure communication link 39 between the portable device 10 and the communication gateway 29 can be a BLE communication link. Alternatively, as noted above, a Wi-Fi, Wi-Fi direct, UWB, and/or IR UWB communication link may be used in place of the BLE communication link. The REPA system 1 may be configured to provide additional authentication of the secure communication link 39 with the portable device 10. For example, the communication gateway 29 can communicate with the link authentication module 22 to authenticate the portable device 10 and establish the secure communication link 39. For example, the link authentication module 22 can be configured to implement challenge-response authentication. In such case, timing information about the communication between the communication gateway 29 and the portable device 10 is sent to the timing control module 25, which communicates with the BLE sensors 31A-31F through the vehicle interface 45, as described below. Further, the communication gateway 29 can communicate information about communication channels and channel switching parameters to the connection information distribution module 24. The connection information distribution module 24 is configured to communicate with each of the BLE sensors 31A-31F using the vehicle interface 45 and to provide the BLE sensors 31A-31F with communication information necessary for the BLE sensors 31A-31F to find and then follow, or eavesdrop on, the secure communication link 39 once the BLE sensors 31A-31F are synchronized with the communication gateway 29. While FIGS. 1 and 2 illustrate the REPA system 1 with six BLE sensors 31A-31F, any number of BLE sensors can be used. For example, the REPA system 1 can include seven, eight, nine, ten, eleven, twelve, or more BLE sensors. In this way, while the present disclosure provides an example utilizing BLE six sensors, additional or fewer BLE sensors can be used in accordance with the present disclosure. While BLE sensors are described in the above example, as noted above, other wireless communication sensors, such as Wi-Fi, Wi-Fi direct, UWB, and/or IR UWB sensors, can be used in place of the BLE sensors.

Figure 3:
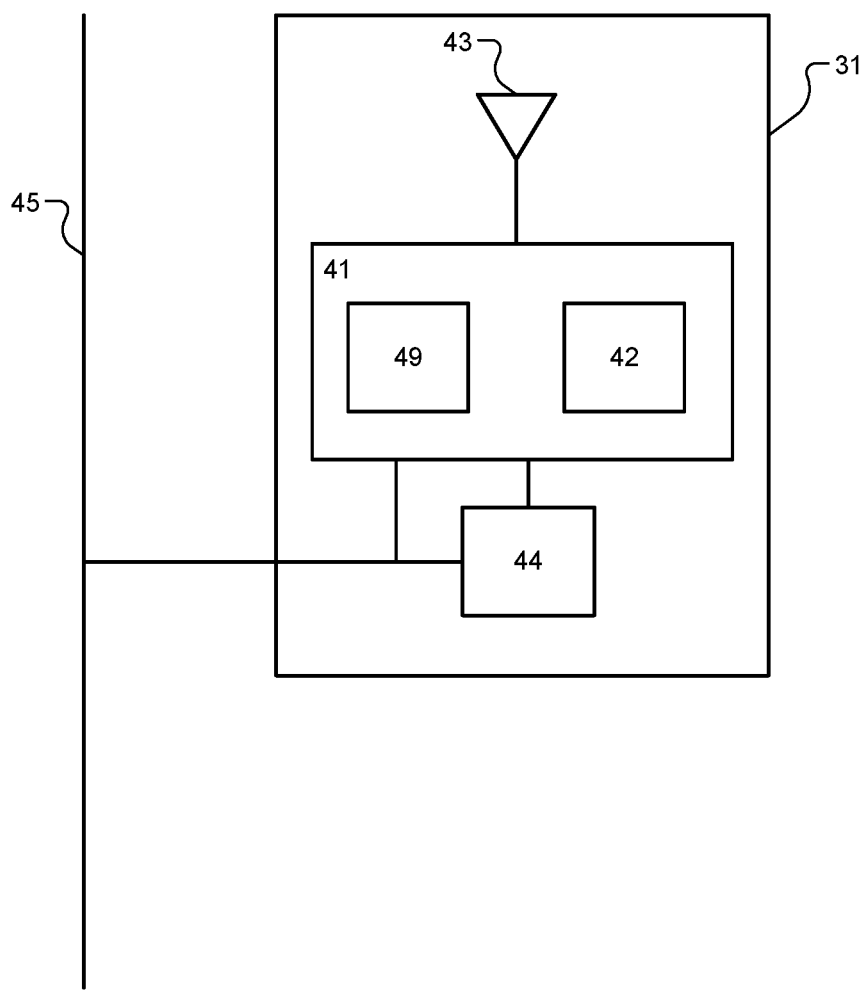
FIG. 3 illustrates a block diagram for a BLE sensor of a REPA system according to the present disclosure.

With reference to FIG. 3, each of the BLE sensors 31 includes a BLE chipset 41 connected to an antenna 43. As shown in FIG. 3, the antenna 43 may be located internal to the BLE sensors 31. Alternatively, the antenna 43 may be located external to the BLE sensors 31. The sensors BLE 31 receive BLE signals using the antenna 43 and, specifically, receive BLE physical layer messages using a BLE physical layer (PHY) controller 49. The BLE sensors 31 are capable of observing BLE physical layer messages and taking measurements of the physical properties of the associated signals, including, for example, the received signal strength (RSSI) using a channel map that is produced by a channel map reconstruction module 42. Additionally or alternatively, the BLE sensors 31 can determine other measurements of the physical properties of the associated signals, including, for example, data related to the angle of arrival. Additionally or alternatively, the BLE sensors 31 can communicate with each other and/or communicate with the communication gateway 29 via the vehicle interface 45 to determine time difference of arrival, time of arrival, or angle of arrival data for signals received by multiple BLE sensors. Additionally or alternatively, the BLE sensors 31 can measure and determine round trip time of flight information about signals sent and received to and from the user device 10.

The BLE sensors 31 receive timing information and channel map information from the communication gateway 29 via the vehicle interface 45. A timing synchronization module 44 is configured to accurately measure the reception times of messages on the vehicle interface 45 and pass the timing information to the BLE chipset 41. The BLE chipset 41 is configured to take the channel map information and the timing signals and to tune the PHY controller 49 to a specific channel at a specific time and observe all physical layer messages and data that conform to the Bluetooth physical layer specification, which includes the normal data rates proposed or adopted, for example, in the Bluetooth Specification version 5.0. The data, timestamps and measured signal strength are reported by the BLE chipset 41 to the communication gateway 29, or other vehicle modules 20, of the vehicle 30 via the vehicle Interface 45. Additionally or alternatively, angle of arrival and round trip time of flight data can be reported by the BLE chipset 41 to the communication gateway 29, or other vehicle modules 20.

Figure 4:
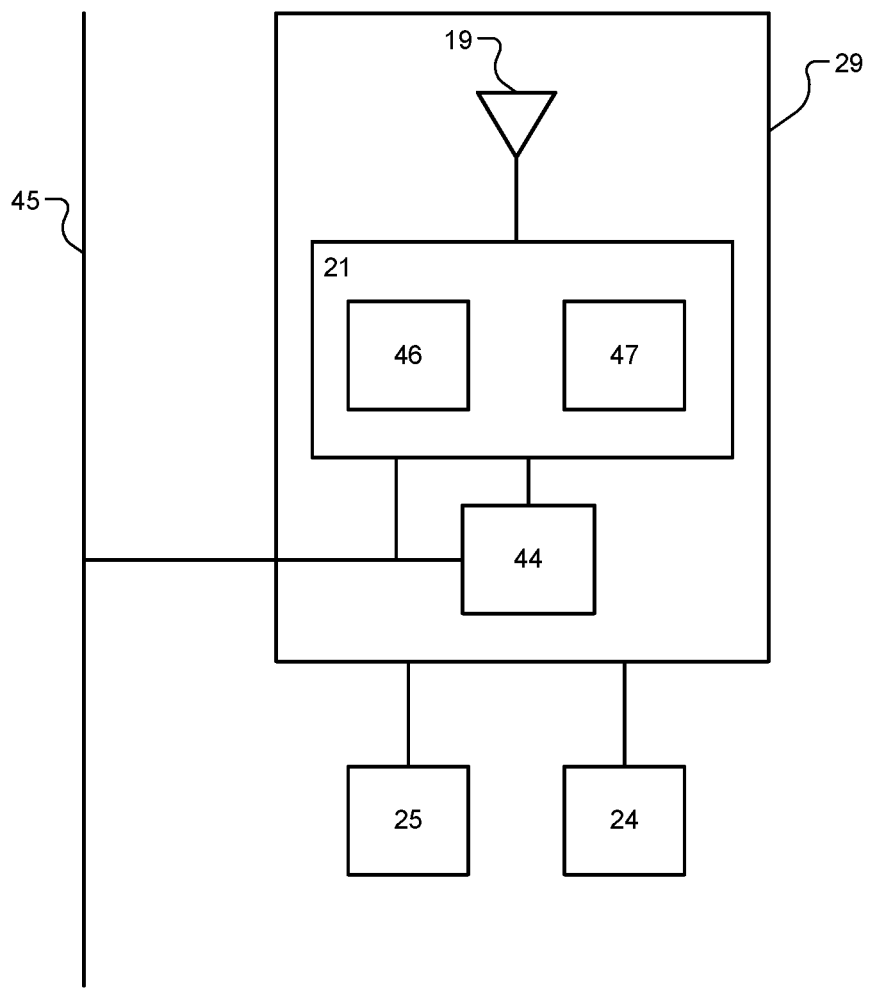
FIG. 4 illustrates a block diagram for a communication gateway of a REPA system according to the present disclosure.

With reference to FIG. 4, the communication gateway 29 includes the BLE chipset 21 connected to an antenna 19 to receive BLE Signals. The BLE chipset 21 implements a Bluetooth protocol stack 46 that is, for example, compliant with the BLE specification, including, for example, version 5 of the BLE specification. The BLE chipset 21 also includes an application 47 implemented by application code stored in a computer-readable medium, such as a storage module. The application 47 may include modifications outside of the Bluetooth specification to enable the BLE chipset 41 to inspect timestamped data transmitted and received by the BLE chipset 41, regardless of the validity of the data. For example, the application 47 enables the BLE chipset 41 to compare transmitted and received data against expectations. The communication gateway 29 is configured to transmit the actual transmitted and received data to vehicle systems of the vehicle 30 via the vehicle interface 45. Alternatively, the communication gateway 29 can be configured to receive the data from each of the BLE sensors 31 via the vehicle interface 45. The application 47 can be further configured to enable the BLE chipset 21 to confirm that each of the BLE sensors 31 has received the correct data at the correct time, as described in further detail below.

With continued reference to FIG. 4, the communication gateway 29 is further configured to provide information about ongoing connections and timing signals necessary for each of the BLE sensors 31 to find the connection being maintained by the communication gateway 29 with the portable device 10, for example, and to subsequently follow the connection. The Bluetooth protocol stack 46 is configured to provide the channel map, access identifier, next channel, and the time to the next channel to the application 47. The Bluetooth protocol stack 46 is configured to output timing signals for the timestamps of transmission and reception events to the application 47 and/or a digital PIN output of the BLE Chipset 21. The communication gateway 29 also includes the timing synchronization module 44. The timing synchronization module 44 is configured to accept the timing signals and works in conjunction with the vehicle interface 45 to create accurate time stamps of connection information messages and other communications.

Figure 5:
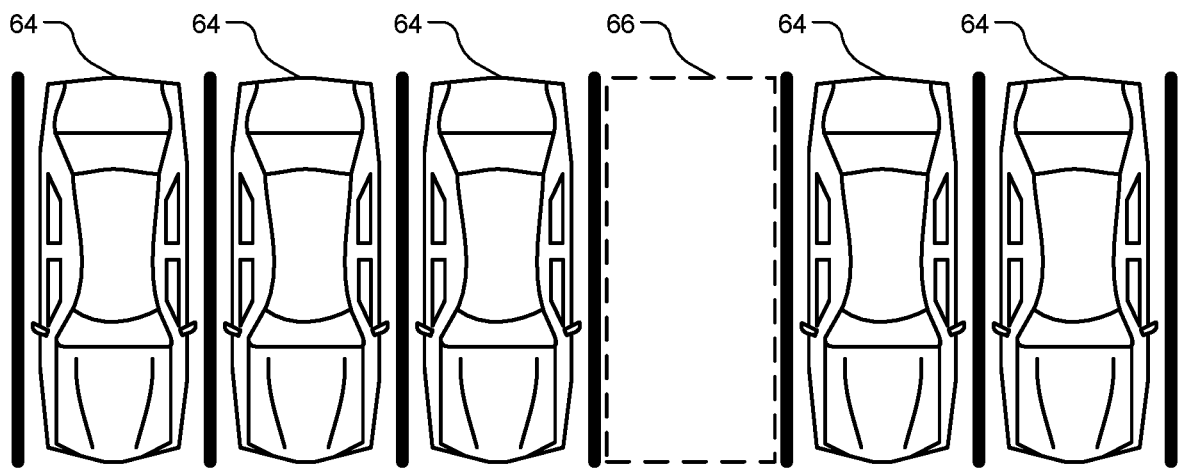
FIG. 5 illustrates a REPA system according to the present disclosure.
Figure 5:
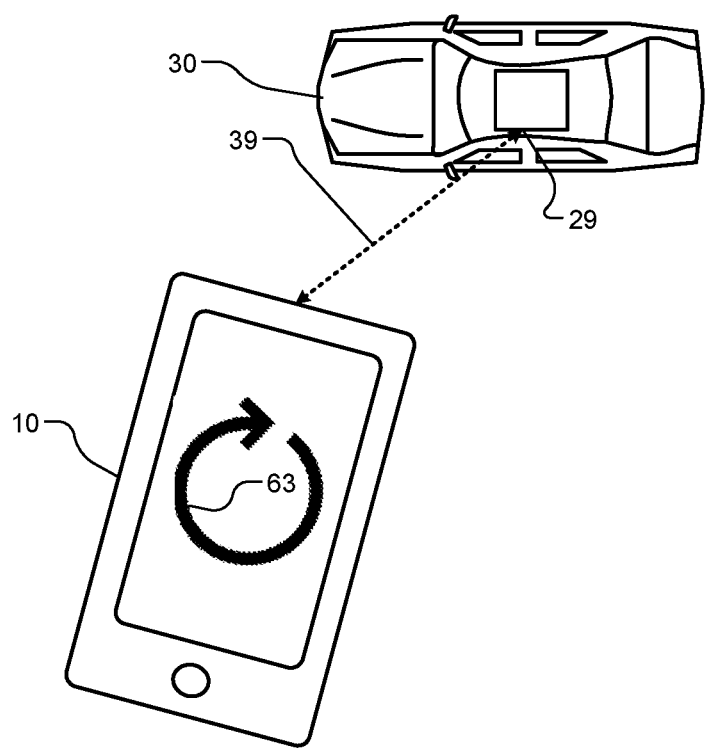

With reference to FIG. 5, an example vehicle 30 with the REPA system 1 is shown. As discussed previously, the REPA system 1 identifies a parking space 66 based on the plurality of object sensors 34 detecting the presence or absence of secondary vehicles 64 and/or objects. Once the REPA system 1 has identified the parking space 66, the REPA system 1 displays the parking space 66 on a display of the vehicle 30. A driver of the vehicle 30 or another passenger may select the parking space 66 or ask the REPA system 1 to look for another parking space 66. When the driver accepts the parking space 66, the driver may choose to remain in the vehicle 30 while the REPA system 1 maneuvers the vehicle 30. Alternatively, the drive may choose to exit the vehicle 30 while the REPA system 1 maneuvers the vehicle 30 in or out of the parking space 66. The REPA system 1 may require the driver of the vehicle 30 to be within a predetermined distance of the vehicle 30 in order for the REPA system 1 to take automated control of the vehicle 30. For example, the predetermined distance may be 3 meters or another suitable distance. The REPA system 1 may also require user input such as a continuous movement gesture 63 on a touch screen display of the portable device 10 to ensure that the driver is attentive and watching over the vehicle 30 as the REPA system 1 maneuvers the vehicle 30. For example, the driver may be required to perform the continuous movement gesture 63 such as move a finger in a circular direction on the display of the portable device 10 throughout the automated parking process. In response to the REPA system 1 detecting that the driver has ceased the continuous movement gesture 63, the REPA system 1 may stop the vehicle 30.

In this manner the driver is held responsible for the vehicle 30. Furthermore, if the application software 12 on the portable device 10 crashes, the REPA system 1 may stop maneuvering the vehicle 30.

Figure 6:
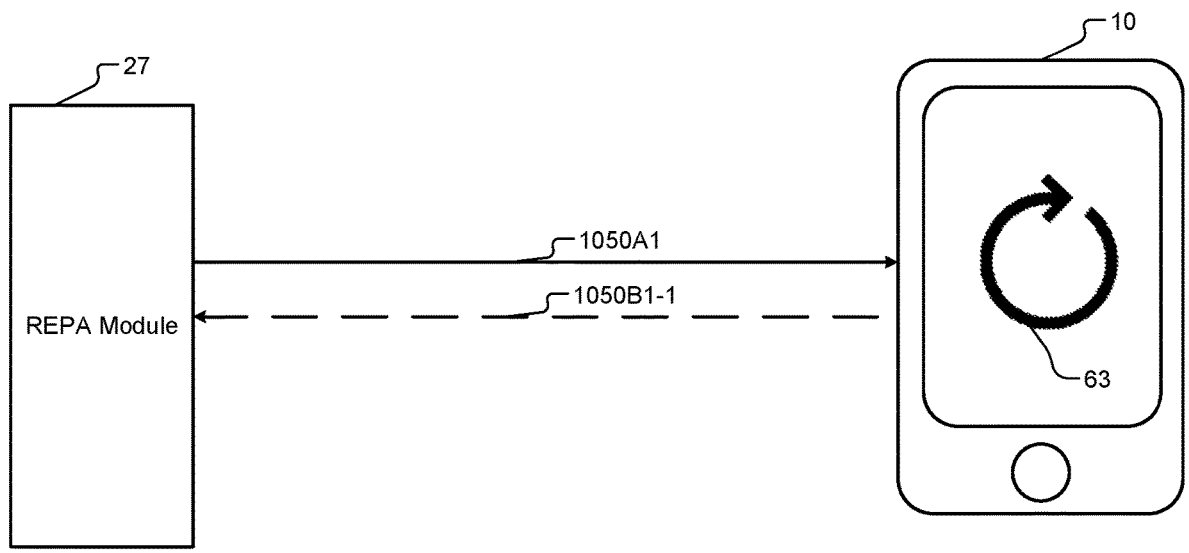
FIG. 6-7 illustrate a block diagram for message flow between a REPA system and a portable device according to the present disclosure.
Figure 7:
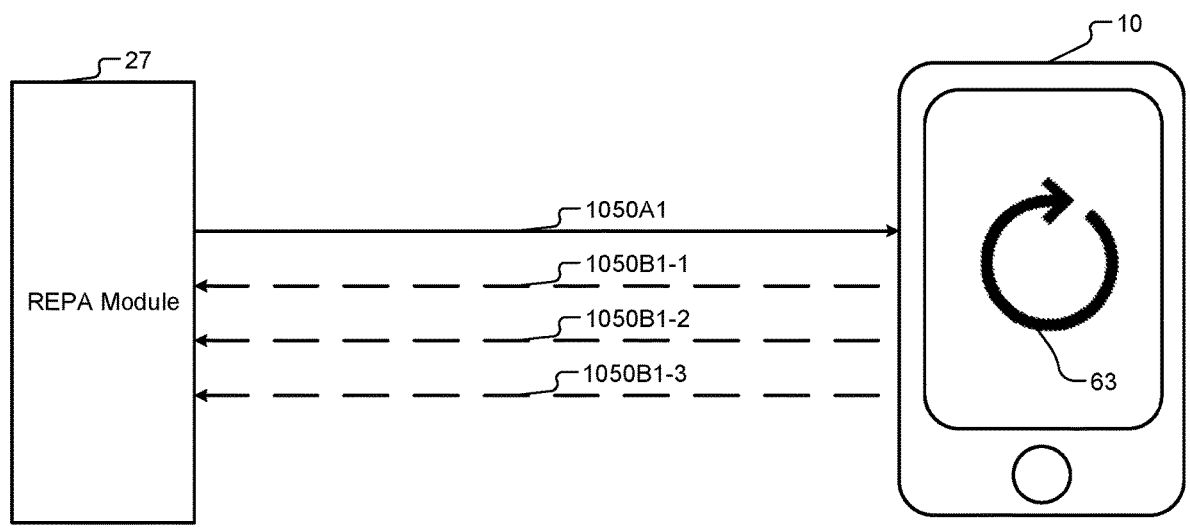

FIG. 6-7 illustrate a message flow diagram between the REPA module 27 and the portable device 10 communicating via BLE communication. With reference to FIG. 6, the REPA module 27 sends a vehicle maneuver request 1050A1, through the communication gateway 29, to the portable device 10 to confirm the continuous movement gesture 63. The portable device 10, in response to receiving the vehicle maneuver request 1050A1, transmits a first response 105061-1 back to the REPA module 27 indicating whether user input such as the continuous movement gesture 63 was received. This process is repeated in a loop until the vehicle 30 has reached the parking space 66 or the vehicle 30 has been maneuvered out of the parking space 66. Due to signal processing constraints such as latency in transmitting, receiving, and processing signals, the total response time may be higher than what is desirable. The present disclosure provides additional features to traditional REPA systems 1, in that, the REPA module 27 is able to confirm the continuous movement gesture 63 at a faster rate than was previously possible.

As discussed above, the REPA system 1 maneuvers the vehicle 30 in the parking space 66 under the supervision of the driver of the vehicle 30 as verified by the continuous movement gesture 63 performed on the portable device 10. The REPA module 27 may indicate in the vehicle maneuver request 1050A1 that a plurality of responses 1050B1-1-1050B1-3 are requested from the portable device 10 in response to the portable device 10 receiving the vehicle maneuver request 1050A1. The plurality of responses 105081-1-105081-3 indicate whether user input such as the continuous movement gesture 63 is being received at the portable device 10. In this manner, the REPA system 1 is able to confirm that the continuous movement gesture 63 is being performed on the portable device 10 at a faster rate than was previously possible. For example, the vehicle maneuver request 1050A1 may indicate that three responses are requested from the portable device 10 for each vehicle maneuver request 1050A1 received, as shown in FIG. 7. The vehicle maneuver request 1050A1 may be transmitted to the portable device 10 once every predetermined period while the REPA system 1 is maneuvering the vehicle. For example, the predetermined period may be set to 125 milliseconds (ms). In another example, the predetermined period may be set to 250 ms. While the examples of 125 ms and 250 ms are provided, the predetermined period may be set to any suitable time period. In addition, the vehicle maneuver request 1050A1 may include timing constraints for transmission of the responses 105061-1-1005131-3. For example, the vehicle maneuverer request 1050A1, may also contain instructions for the portable device 10 to wait for a predetermined period before transmitting each response 1050131-1-1050131-3. For example, the predetermined period may be set to 30 ms. In another example, the predetermined period may be set to 45 ms. While the examples of 30 ms and 45 ms are provided, the predetermined period may be set to any suitable time period.

Figure 8:
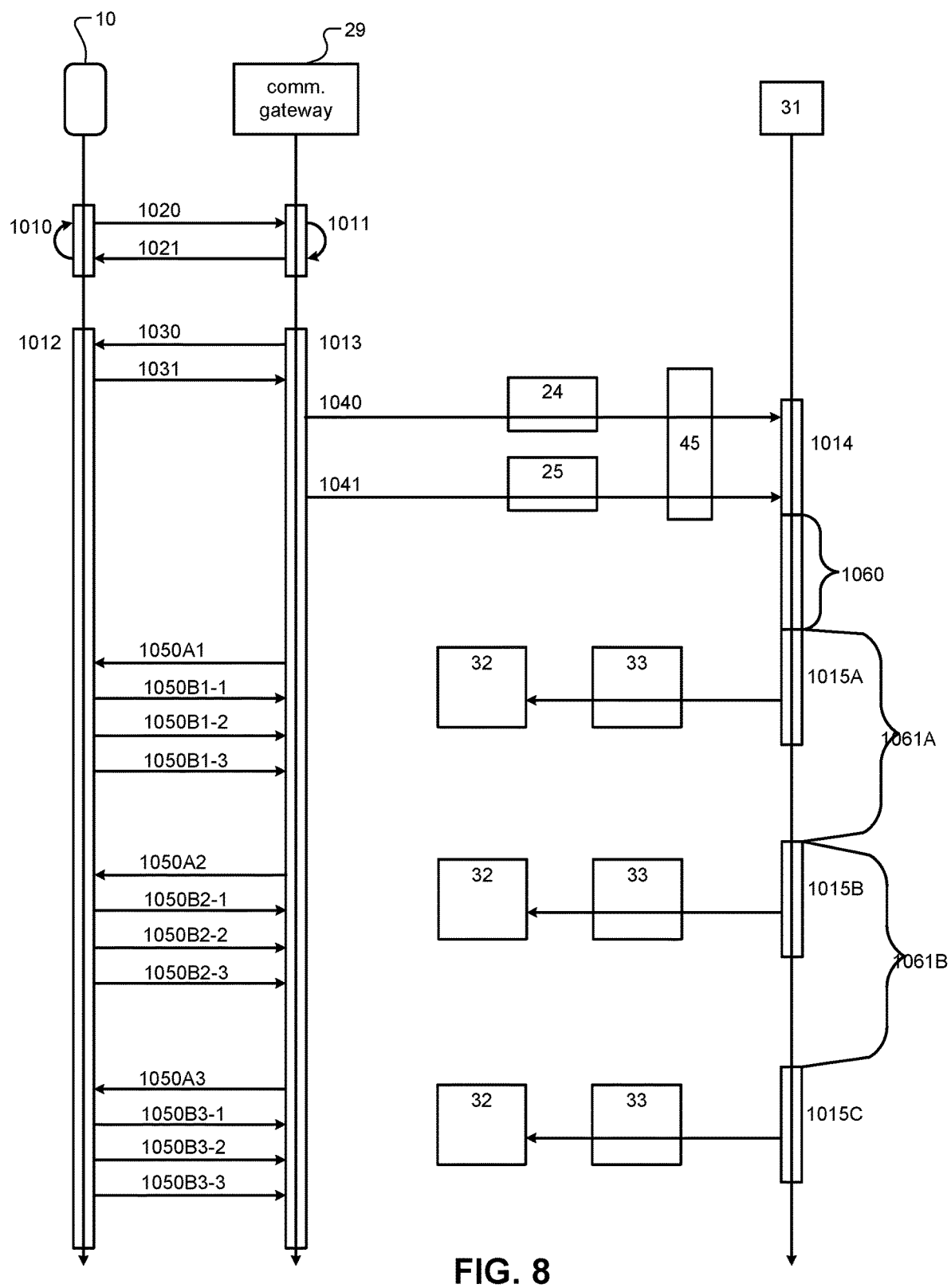
FIG. 8 illustrates operation of a REPA system according to the present disclosure.

With reference to FIG. 8, operation of the REPA system 1 according to the present disclosure is described. In the example of FIG. 8, the portable device 10 is configured as a BLE Peripheral. The system, however, would work equally as well if the portable device 10 were instead configured as a BLE Central. During the process 1010, the portable device 10 continues to advertise 1020, as defined by the BLE specification until a connection with the communication gateway 29 can be established in accordance with the Bluetooth specification. During the process 1011, the communication gateway 29 performs a scan of the portable device 10, as defined by the Bluetooth specification. Once the communication gateway 29 has discovered the portable device 10, it sends a link request 1021 to the portable device 10, in accordance with the methods defined by the Bluetooth specification. Once a connection between the communication gateway 29 and the portable device 10 is established, the process of advertising 1010 and scanning 1011 can be terminated in accordance to the Bluetooth specification.

After a communication link 39 is established, the communication gateway 29 begins process 1013 and the portable device 10 begins process 1012 to maintain the link in accordance with the Bluetooth specifications. After the communication link 39 is established, the communication gateway 29 is aware of all of the connection parameters for the communication link 39 and exchanges the connection parameter information with the connection information distribution module 24 using a message 1040.

The vehicle interface 45 receives the connection parameter information and passes the information to the BLE Chipset 41 of the BLE sensors 31. The communication gateway 29 communicates timing information messages 1041 to the timing control module 25. The BLE sensors 31 receive the timing information messages 1041 via the vehicle interface 45. The timing synchronization module 44 within the BLE sensors 31 receives the timing information messages 1041. The timing control module 25 is configured to send messages with signal 1041 containing the time to the next event as measured relative to the message itself. The timing synchronization module 44 is capable of accurately timestamping incoming messages on the vehicle interface 45 and controlling the BLE Chipset 41 to observe the necessary channels according to the connection parameters.

With continued reference to FIG. 8, the BLE sensors 31 execute process 1014 to receive incoming connection information 1040 and timing signals 1041. The BLE sensors 31, uses the channel map reconstruction module 42 to reproduces the connection information schedule table. The BLE sensor 31 sets its time base relative to the timing signals 1041 and learns the time and channel of the next connection event to observe in the connection information message 1040. As such, the BLE sensor 31 can compute the time until the next connection event 1060. The calculation of time window 1060 is corrected for the accuracy of synchronization through the timing control module 25 and clock errors of each device. The BLE sensor 31 waits for the computed time 1060 and then begins to observe 1015A the central to peripheral communications 1050A and peripheral to master communications 1050B.

The BLE sensors 31 are configured to measure the received energy strength of each of the transmissions 1050A and 1050B. Other parameters the BLE sensors 31 can be configured to measure include: (1) the data in each of the transmissions 1050A and 1050B; (2) mathematical derivations of the data such as hashing functions, like SHA256, for example; (3) time of arrival of 1050A and 1050B; (4) time difference of arrival of 1050A and 1050B; (5) phase angle and phase angle of arrival of each 1050A and 1050B; The scan width of 1015A is defined by the uncertainty of timing involved as well as the pre-scan and post-scan behaviors. The pre-scan and post-scan are critical for verifying that no attacker is present within the uncertainty window of the system. The information collected during observation 1015A is passed through the security filtering module 33 to the localization module 32. The BLE sensors 31 then wait the connection interval time 1061A until the next connection event. The connection interval time 1060A-B is computed such that the clock accuracies, synchronization errors, and pre-scan and post-scan parameters impact the next wake up time. After the connection interval time 1061A has elapsed, the BLE sensors 31 start observations 1015B on the next channel in the reproduced channel map. The process repeats in perpetuity until either the connection is lost, the vehicle 30 has reached the parking space 66, the driver of the vehicle has ceased the continuous movement gesture 63, or a command from the timing control module 25 commands the BLE sensors 31 to stop following the communication link 39. While the process is explained with BLE sensors 31, as discussed earlier the BLE sensors 31 may be omitted.

Figure 9:
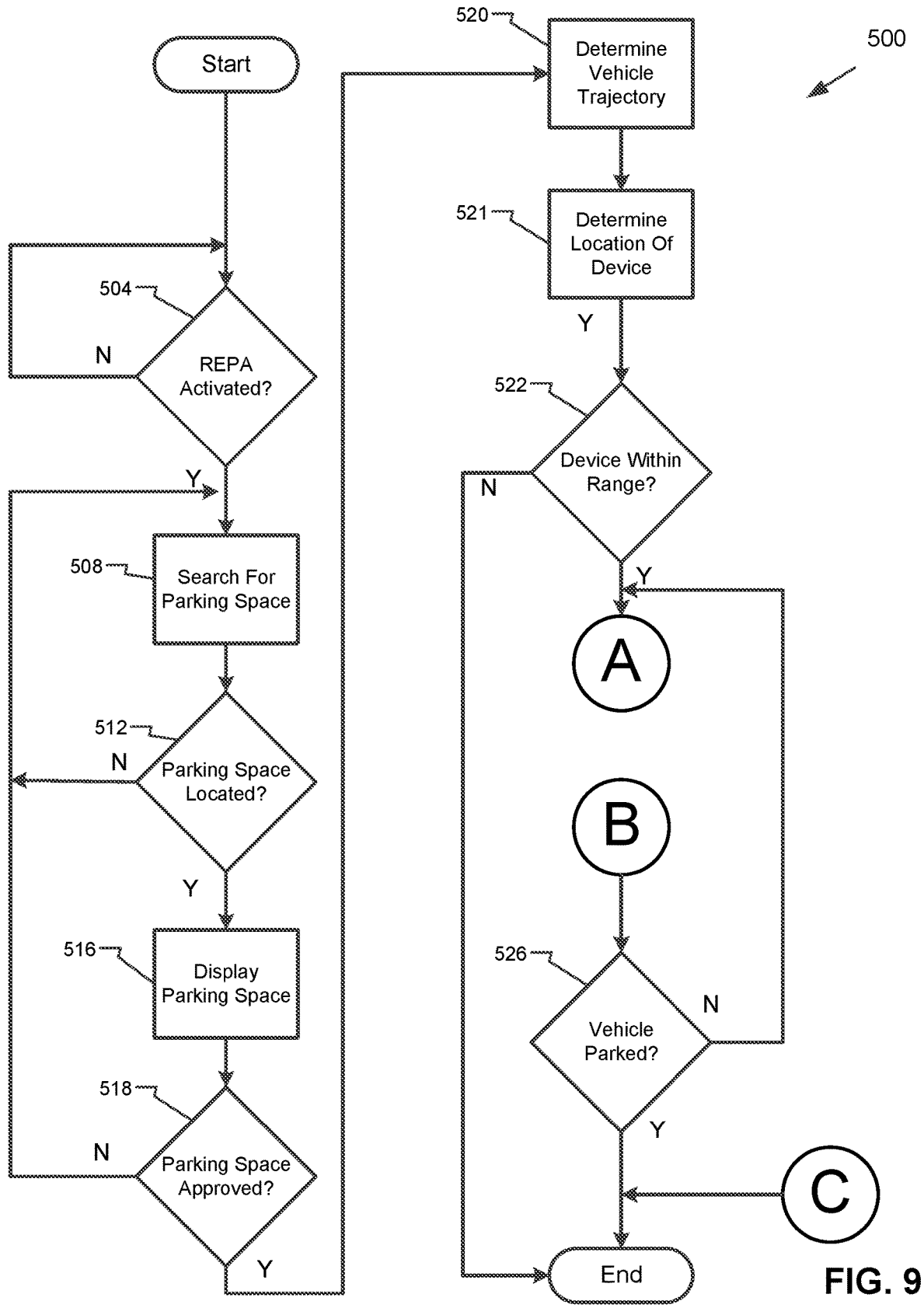
FIG. 9 is a flowchart depicting an example method of a REPA system maneuvering the vehicle into a parking space according to the present disclosure.

FIG. 9 is a flowchart depicting an example method of the REPA system 1 maneuvering the vehicle 30 into the parking space 66. Control may begin with 504 where the REPA system 1 is activated. If true, control continues with 508. If false, control remains at 504. At 508, the REPA system 1 searches for the parking space 66. At 512, the REPA system 1 determines whether the parking space 66 has been located. If true, control continues at 516. If false, the REPA system 1 continues to search for the parking space 66 at 508. At 516, the REPA system 1 displays the parking space 66 on a display of the vehicle 30. At 518, the driver or another passenger of the vehicle 30 may choose to accept or reject the parking space 66. If true, control continues at 520. If false, control continues back at 508. At 520, the REPA system 1 determines the movement trajectory for the vehicle 30 in order to reach the parking space 66 and control continues at 521. At 521, the REPA system 1 determines the location of the portable device 10 relative to the vehicle 30 and control continues at 522. At 522, the REPA system 1 determines whether the portable device 10 is within a predetermined range of the vehicle 30. If true, control continues at 604 in FIG. 10. If false, control may end.

Figure 10:
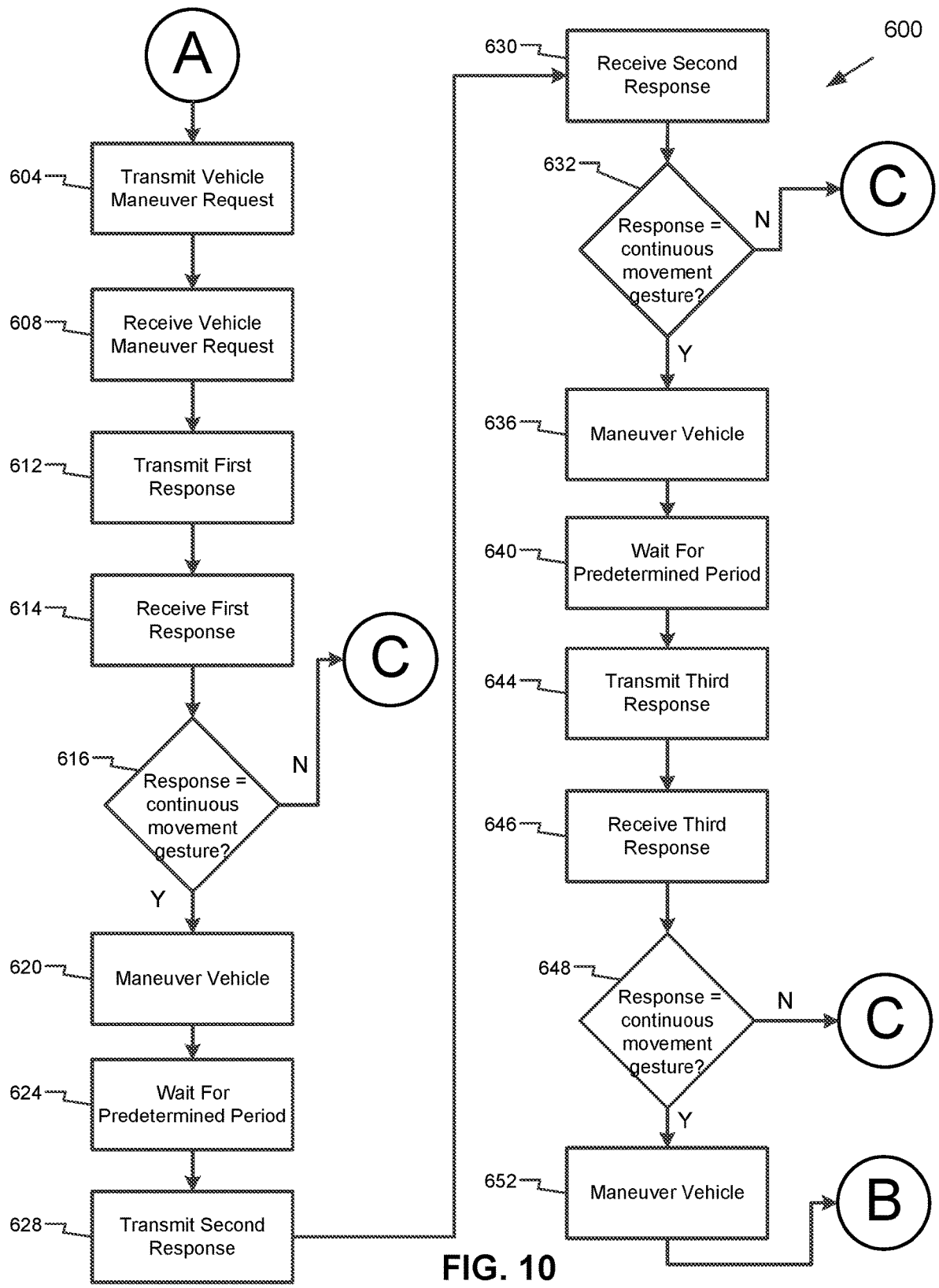
FIG. 10 is a flowchart depicting an example method of verifying user input for a REPA system according the present disclosure.

FIG. 10 is a flowchart depicting an example method 600 of verifying user input such as the continuous movement gesture 63 according the present disclosure. Control may begin with 604. At 604, the REPA system 1 transmits the vehicle maneuver request 1050A1 to the portable device 10. At 608, the portable device 10 receives the vehicle maneuver request 1050A1. At 612, the portable device 10 transmits the first response 105061-1. At 614, the REPA system 1 receives the first response 105061-1 and control continues at 616. At 616, the REPA system 1 determines whether the first response 105061-1 indicates the continuous movement gesture 63 is being performed on the portable device 10. If true, control continues at 620. If false, control may end. While control is shown as ending, control may return to 604.

At 620, the REPA system 1 maneuvers the vehicle 30 into the parking space 66. At 624, the portable device 10 waits for a predetermined period. At 628, the portable device 10 transmits a second response 105061-2 and control continues at 630. At 630, the REPA system 1 receives the second response 105061-2. At 632, the REPA system 1 determines whether the second response 105061-2 indicates the continuous movement gesture 63 is being performed on the portable device 10. If true, control continues at 636. If false, control may end. At 636, the REPA system 1 continues to maneuver the vehicle 30 into the parking space 66. At 640, the portable device 10 waits for a second predetermined period and control continues at 644. At 644, the portable device 10 transmits the third response 105061-3 and control continues at 646. At 646, the REPA system 1 receives the third response 105061-3 and control continues with 648. At 648, the REPA system 1 determines whether the third response 105061-3 indicates the continuous movement gesture 63 is being performed on the portable device 10. If true, control continues at 652. If false, control may end. At 652, the REPA system 1 continues to maneuver the vehicle 30 into the parking space 66 and control continues at 526 of FIG. 9. At 526, the REPA system 1 determines whether the vehicle 30 has reached the parking space 66. If true, control may end. If false, control may continue back at 604 of FIG. 10.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
   a communication gateway in a vehicle configured to establish a wireless communication connection with a portable device;
   a plurality of object sensors that detect objects surrounding the vehicle; and
   a remote park assist system configured to (i) identify at least one parking space based on data received from the plurality of object sensors; (ii) display the at least one parking space on a display of the vehicle; (iii) receive input indicating approval of the parking space; (iv) determine a movement trajectory for the vehicle based on a location of the parking space; (v) transmit a first vehicle maneuver request to the portable device, the first vehicle maneuver request including instructions indicating a first number of a first plurality of responses to be sent by the portable device in response to the first vehicle maneuver request and a first predetermined time period for the portable device to wait in between sending consecutive responses of the first plurality of responses; (vi) receive the first plurality of responses from the portable device in response to transmitting the first vehicle maneuver request and prior to transmitting a second vehicle maneuver request to the portable device, the second vehicle maneuver request including instructions indicating a second number of a second plurality of responses to be sent by the portable device in response to the second vehicle maneuver request and a second predetermined time period for the portable device to wait in between sending consecutive responses of the second plurality of responses, each response of the first and second plurality of responses indicating whether user input has been received at the portable device; and (vii) maneuver the vehicle based on the plurality of object sensors and the movement trajectory while the first and second plurality of responses continue to indicate that user input has been received at the portable device;

wherein the portable device is configured to transmit the first plurality of responses, by waiting for the first predetermined time period in between sending consecutive responses of the first plurality of responses, in response to receiving the first vehicle maneuver request from the remote park assist system and to transmit the second plurality of responses, by waiting for the second predetermined time period in between sending consecutive responses of the second plurality of responses, in response to receiving the second vehicle maneuver request from the remote park assist system.

2. The system of claim 1, wherein the remote park assist system is configured to stop the vehicle in response to a determination that the portable device is not within a predetermined range of the vehicle.

3. The system of claim 1, wherein the first number of the first plurality of responses and the second number of the second plurality of responses is three and the first and second plurality of responses each include a first response, a second response, and a third response.

4. The system of claim 3, wherein the remote park assist system is configured to stop the vehicle in response to not receiving at least one of the first response, the second response, and the third response from the portable device within a third predetermined time period after one of the first or second vehicle maneuver request has been transmitted to the portable device.

5. The system of claim 4, wherein the user input is a continuous movement gesture on a touch display of the portable device.

6. The system of claim 1, wherein the first predetermined time period and the second predetermined time period are equal and set to 30 ms.

7. The system of claim 1, wherein the first predetermined time period and the second predetermined time period are not equal.

8. A method comprising: (i) establishing, with a communication gateway in a vehicle, a wireless communication connection with a portable device; (ii) detecting objects surrounding the vehicle with a plurality of object sensors; (iii) identifying at least one parking space based on data received from the plurality of object sensors; (iv) displaying the at least one parking space on a display of the vehicle; (v) receiving input indicating approval of the parking space; (vi) determining a movement trajectory for the vehicle based on a location of the parking space; (vii) transmitting a first vehicle maneuver request to the portable device, the first vehicle maneuver request including instructions indicating a first number of a first plurality of responses to be sent by the portable device in response to the first vehicle maneuver request and a first predetermined time period for the portable device to wait in between sending consecutive responses of the first plurality of responses; (viii) receiving the first plurality of responses from the portable device in response to transmitting the first vehicle maneuver request and prior to transmitting a second vehicle maneuver request to the portable device, the second vehicle maneuver request including instructions indicating a second number of a second plurality of responses to be sent by the portable device in response to the second vehicle maneuver request and a second predetermined time period for the portable device to wait in between sending consecutive responses of the second plurality of responses, each response of the first and second plurality of responses indicating whether user input has been received at the portable device; (ix) maneuvering the vehicle based on the plurality of object sensors and the movement trajectory while the first and second plurality of responses continue to indicate that user input has been received at the portable device; (x) transmitting, using the portable device, the first plurality of responses, by waiting for the first predetermined time period in between sending consecutive responses of the first plurality of responses, at the first in response to receiving the first vehicle maneuver request; and (xi) transmitting, using the portable device, the second plurality of responses, by waiting for the second predetermined time period in between sending consecutive responses of the second plurality of responses, in response to receiving the second vehicle maneuver request.

9. The method of claim 8, further comprising stopping the vehicle in response to a determination that the portable device is not within a predetermined range of the vehicle.

10. The method of claim 8, wherein the first number of the first plurality of responses and the second number of the second plurality of responses is three and the first and second plurality of responses each include a first response, a second response, and a third response.

11. The method of claim 10, further comprising stopping the vehicle in response to not receiving at least one of the first response, the second response, and the third response from the portable device within a third predetermined time period after one of the first or second vehicle maneuver request has been transmitted to the portable device.

12. The method of claim 11, wherein the user input is a continuous movement gesture on a touch display of the portable device.

13. The method of claim 8, wherein the first predetermined time period and the second predetermined time period are equal and set to 30 ms.

14. The method of claim 8, wherein the first predetermined time period and the second predetermined time period are not equal.

* * * * *

UNITED STATES PATENT AND TRADEMARK OFFICE
CERTIFICATE OF CORRECTION

| | |
|---|---|
| PATENT NO. | : 11,269,323 B2 |
| APPLICATION NO. | : 16/359087 |
| DATED | : March 8, 2022 |
| INVENTOR(S) | : Kyle Golsch |

It is certified that error appears in the above-identified patent and that said Letters Patent is hereby corrected as shown below:

On the Title Page

Page 2, Column 2, U.S. Patent Documents, Line 20: After "H04W 4/44", insert -- ¶2003/0004613 A1 1/2003 Hahn et al. --

In the Claims

Column 14, Line 22: In Claim 8, after "responses,", delete "at the first"

Signed and Sealed this
Twenty-fourth Day of May, 2022

*Katherine Kelly Vidal*

Katherine Kelly Vidal
*Director of the United States Patent and Trademark Office*